(Model.)
R. FARIES.
KNOT FOR CHECK ROW WIRES.
No. 420,992. Patented Feb. 11, 1890.
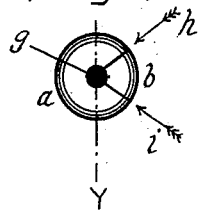
Fig. 1.
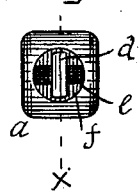
Fig. 2.
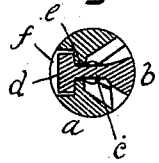
Fig. 3.
Fig. 4.
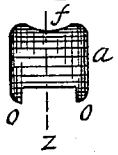
Fig. 5.
Fig. 6.
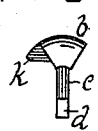
Fig. 7.
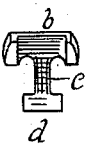
Fig. 8.
Fig. 9.
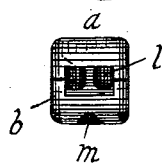
Fig. 10.
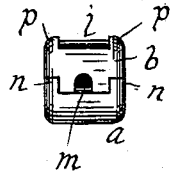
Fig. 11.
Fig. 12.
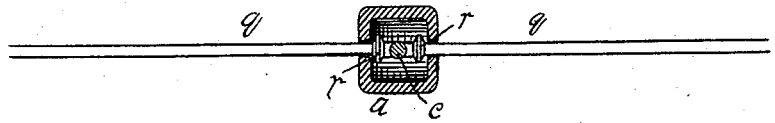
ATTEST
Helen Graham
W. W. Graham
INVENTOR
Robt. Faries
By L. P. Graham
Atty.

UNITED STATES PATENT OFFICE.

ROBERT FARIES, OF DECATUR, ILLINOIS.

KNOT FOR CHECK-ROW WIRES.

SPECIFICATION forming part of Letters Patent No. 420,992, dated February 11, 1890.

Application filed June 7, 1889. Serial No. 313,440. (Model.)

*To all whom it may concern:*

Be it known that I, ROBERT FARIES, of the city of Decatur, county of Macon, and State of Illinois, have invented certain new and useful Improvements in Stops for Check-Row Wires, of which the following is a specification.

It is the object of my invention to provide stops that will hold sections of wire together and that may be readily connected and disconnected to pass trees and other obstructions, to adapt the wire to the length of the field, and to replace worn sections with new ones; and I attain this object and at the same time provide a perfect swivel and desirable form of stop by means of the details of construction and combination of parts hereinafter set forth and claimed.

My invention comprises, essentially, a stop composed of two parts adapted to receive knobs on the ends of sections of wires, one part having a slot or a rectangular or irregular formed opening and the other part having a twistable shank carrying a head adapted to the slot or opening. Other desirable features will appear in the following detailed description and in the claims.

In the drawings accompanying and forming a part of this specification, Figure 1 is an end view of my device. Fig. 2 is a side view of the same. Fig. 3 is a section on broken line $x$ in Fig. 2. Fig. 4 is an end view of the slotted portion. Fig. 5 is a side view of the same. Fig. 6 is a section on broken line $z$ in Fig. 5. Fig. 7 is an end view of the locking portion. Fig. 8 is a side view of the same. Fig. 9 is a view of the peripheral portion of the locking part. Fig. 10 is a side view of the stop from the direction indicated by arrow $h$ in Fig. 1. Fig. 11 is a side view from the direction indicated by arrow $i$ in Fig. 1. Fig. 12 is a section of the stop on broken line $y$ in Fig. 1, showing the wires in position therein.

The part $a$ has the V-shaped lateral opening $g'$ to receive the locking portion $b$. It has the central concavities $g$ to receive the wires, the slot $e$ to admit the passage of the head $d$ of the locking portion, and the recess $f$, that forms a receptacle for the head and provides surfaces against which the shoulders of the head bear when the parts are locked together. In addition to this, it is generally hollow to admit the knobs on the wires, and it has the ledges $n$ and $o$, that coact with ledges on the locking portion to form recesses $l$ and $m$ for a holding-tool. The locking portion $b$ has the twistable shank $c$, carrying the oblong head $d$, the ledges $p\ p$, and the extensions $k\ k$, adapted to fit between ledges $n\ n$ of the receiving or slotted portion $a$. The shank $c$ is integral with peripheral portion $b$ and is capable of twisting without breaking, the latter feature being practically obtained by the use of malleable iron.

The stops are put in use by placing the wires $q$ in concavities $g$, with their knobs $r$ in the positions indicated in Fig. 12, then extending the heads $d$ through slots $e$ and twisting the shanks on their axes until the heads cross the slots and bear against the surfaces of the recesses in a manner to hold the parts firmly together. This operation may be facilitated and closer connections be made by so beveling the surface of the recess that the shoulders of the heads shall tend to pass up slight inclines.

To make or break a connection in the field, a stop is held by an implement, the jaws of which are preferably inserted in recesses $l$ and $m$, and the head is turned into the desired position by a wrench or pinchers.

Ordinarily it will not be necessary to manipulate any one stop any great number of times; but should such a thing occur and the shank break under the torsional strain a new stop or a part of a new stop may be easily applied.

I claim as new and desire to secure by Letters Patent—

1. A stop for check-row wire, comprising two parts adapted to receive knobs on the ends of sections of wire, one part having a slot and the other a twistable shank carrying a head adapted to the slot, as set forth.

2. A stop for check-row wire, comprising two parts adapted to receive knobs on the ends of sections of wire, one part having a slotted peripheral recess and the other a twistable shank carrying a head adapted to the recess and the slot, as set forth.

3. A stop for check-row wire, comprising two parts adapted to receive knobs on the ends of sections of wire, one part having a slot, the other a twistable shank carrying a head adapted to the slot, and the stop having recesses to admit the jaws of a holding-tool, as set forth.

4. In combination with wires $q$, having heads $r$, the two-part stop embracing the knobs and comprising a slotted part, and a part with a twistable shank carrying a head adapted to the slot, as set forth.

In testimony whereof I sign my name in the presence of two subscribing witnesses.

ROBERT FARIES.

Attest:
  I. D. WALKER,
  L. P. GRAHAM.